US009792655B2

(12) United States Patent
Griffin et al.

(10) Patent No.: US 9,792,655 B2
(45) Date of Patent: Oct. 17, 2017

(54) AUTOMATED ASSESSMENT

(71) Applicant: The Travelers Indemnity Company, Hartford, CT (US)

(72) Inventors: Patrick K. Griffin, East Hampton, CT (US); Emily N. Baldi, Manchester, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 442 days.

(21) Appl. No.: 14/580,742

(22) Filed: Dec. 23, 2014

(65) Prior Publication Data

US 2016/0180467 A1 Jun. 23, 2016

(51) Int. Cl.
| G06K 9/00 | (2006.01) |
| G06Q 40/08 | (2012.01) |
| G06F 17/30 | (2006.01) |
| G06K 9/18 | (2006.01) |
| G06F 17/00 | (2006.01) |

(52) U.S. Cl.
CPC ......... *G06Q 40/08* (2013.01); *G06F 17/3053* (2013.01); *G06F 17/3079* (2013.01); *G06K 9/00711* (2013.01); *G06K 9/18* (2013.01)

(58) Field of Classification Search
USPC ........ 382/100, 102–103, 155, 172–173, 181, 382/190, 199, 206, 209, 219, 232, 254, 382/274, 276, 286–291, 305, 312, 260; 707/812, 661; 455/556.1; 705/4
See application file for complete search history.

(56) References Cited

U.S. PATENT DOCUMENTS

| 9,253,349 B2* | 2/2016 | Amtrup ............. H04N 1/00251 |
| 9,280,793 B2 | 3/2016 | English et al. |
| 2010/0048242 A1* | 2/2010 | Rhoads ............. G06F 17/30244 455/556.1 |
| 2010/0250497 A1* | 9/2010 | Redlich ................... F41H 13/00 707/661 |
| 2011/0161117 A1* | 6/2011 | Busque ................. G06Q 40/08 705/4 |
| 2013/0262530 A1* | 10/2013 | Collins ............. G06F 17/30312 707/812 |

* cited by examiner

*Primary Examiner* — Seyed Azarian
(74) *Attorney, Agent, or Firm* — Cantor Colburn LLP

(57) ABSTRACT

A system for automated assessments is provided. The system includes a processing device and a memory device. The memory device stores instructions that when executed by the processing device may result in receiving a video stream including image frames from an imaging source. Image data from one or more of the image frames can be compared with an image profile database to determine whether at least one item in one or more of the image frames is identifiable. A lookup operation can be initiated in a secondary data source to determine one or more item attributes of the one or more identified items. The video stream can be modified to add an item identifier for each of the identified items to the video stream as an annotated video. A record can be stored of the one or more item attributes of the identified items in the annotated video.

21 Claims, 14 Drawing Sheets

AUTOMATED ASSESSMENT

BACKGROUND

Assessors, such as insurance assessors, tax assessors, and various types of inspectors are typically required to personally examine one or more assets as part of a data collection process to assess value, condition, location, or existence of assets. In some instances individuals self-assess property, for example, to create a home or business inventory. Assessors typically use a collection of paper-based forms to gather the needed information and then submit the forms for manual entry into a computer system. Form or questionnaire-based data collection is a tedious and error prone process.

In a self-directed data collection process for insurance, customers may have to complete a series of fixed questions either with the assistance of an agent or through self-service software. Customers may have to choose from a series of predetermined answers that may or may not accurately reflect their situation. The limitations of this approach not only inhibit optimal data collection at the time of initial policy issuance, but can also reduce ongoing assessment of risk over the life of the policy or subsequent policies. Furthermore, relying on fixed questions can prohibit retrospective analysis of underwriting risk from a new perspective.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

According to an embodiment, an automated assessment tool is provided that enables an automated identification and lookup process to identify items and item attributes captured in a video stream. The automated assessment tool provides user interfaces for a user to capture video data including one or more items to be identified. The automated assessment tool may be used by a professional assessor or an individual consumer to gather information about various items, property conditions, and the presence or absence of a predetermined list of items or property conditions.

In the context of an insurance-based application, the automated assessment tool can be executed on a consumer device, referred to herein as an assessment device, to capture video data in support of underwriting decisions. The automated assessment tool can use computer vision to recognize objects and situations in the captured video that may influence underwriting decisions. A management application of a post-processing system can further analyze the video and supplement analysis performed by the automated assessment tool. Since video is a primary source of data, the likelihood of error or intentional misrepresentation is reduced. As analysis algorithms and the underwriting rules evolve, existing videos can be reevaluated without having to recapture the video. By leveraging the processing capabilities of the assessment device which captures the video to perform part or all of the computer vision processing for item identification, the back-end processing burden is reduced as the post-processing system can operate on an annotated version of the video to perform any additional analysis. Further, when the assessment device is coupled to a low-latency high-speed cellular network, real-time or near real-time processing and analysis can be performed, which may allow for the computer vision processing to be split between the assessment device and the post-processing system for faster completion.

An embodiment of the automated assessment tool may be implemented in a software application that runs on a smartphone or tablet computer as the assessment device. The automated assessment tool can use computer vision algorithms to recognize objects and situations in a video taken by the assessment device. The automated assessment tool may evaluate the objects and situations, for instance, as relevant to underwriting decisions. If the automated assessment tool identifies items of importance, the automated assessment tool can transmit information about the items to a post-processing system, such as a quoting and underwriting system for inclusion in the quoting and underwriting process. The automated assessment tool may detect the presence of hazards and valuables but can also identify the absence of important objects, such as safety gear. Further features are described in greater detail herein.

Figure 1:
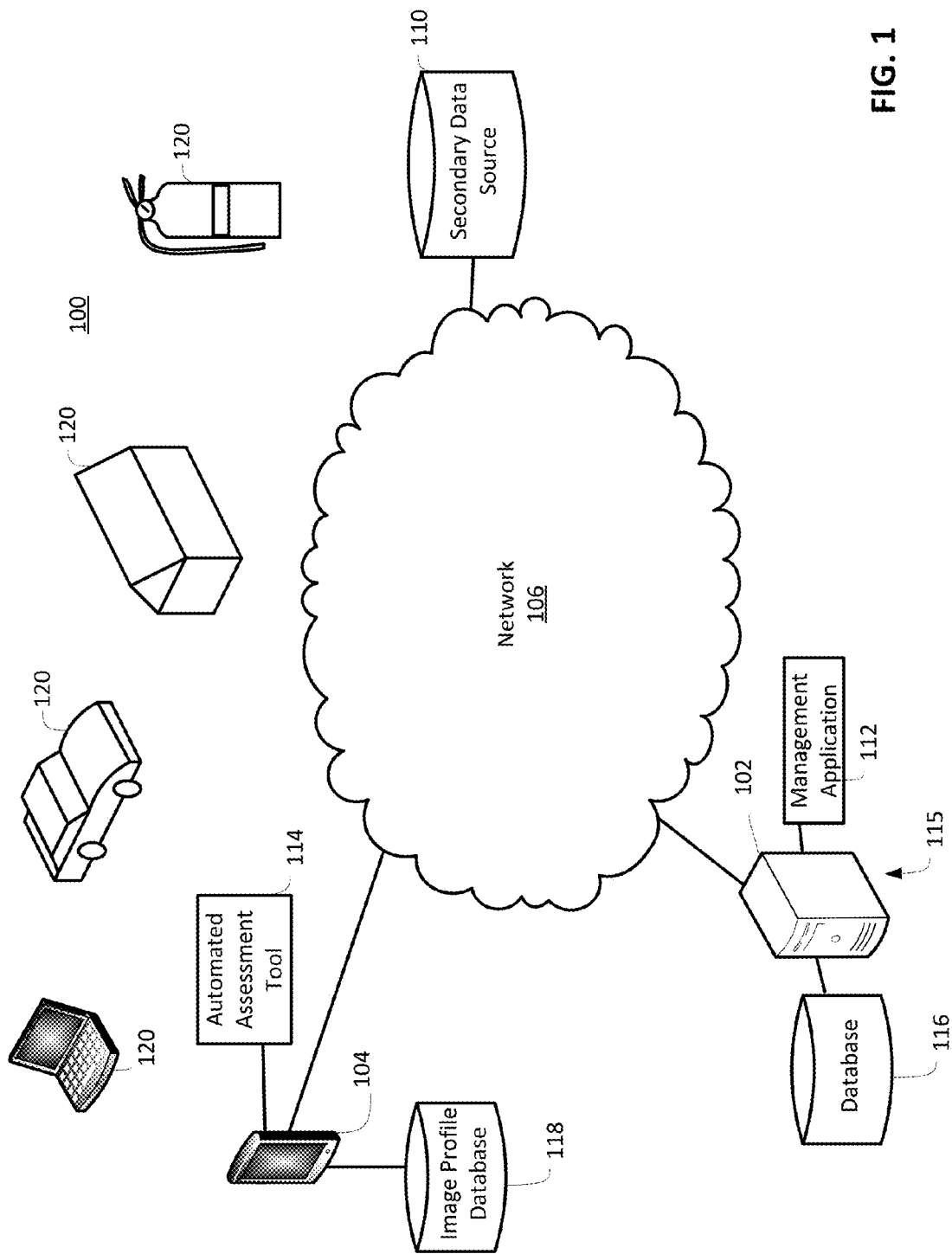
FIG. 1 depicts a block diagram of a system according to some embodiments of the present invention.

Turning now to FIG. 1, a system 100 is depicted upon which an assessment data collection process may be implemented. The system 100 may include at least one post-processing system 102 and at least one assessment device 104 that can communicate via a network 106. The network 106 may also provide access to a secondary data source 110. The secondary data source 110 may include one or more network-accessible database, such as a cloud-based database, that can be accessed by the post-processing system 102 and/or the assessment device 104. The post-processing system 102 may have a management application 112 that provides a management user interface for locally accessing a database 116 that may be populated in part with data received from the assessment device 104 and/or the secondary data source 110. The assessment device 104 may have an automated assessment tool 114 that provides user interfaces to capture, analyze, and report assessment data. The assessment device 104 can include an image profile database 118 that assists in local image identification, while supplemental data about identified items may be determined based on initiating a lookup operation in the secondary data source 110. The image profile database 118 can be accessible over the network 106 to support image recognition across the network 106. As a further alternative, all or a portion of the image profile database 118 may reside across the network 106, e.g., as part of the database 116.

The post-processing system 102 may be a personal computer (e.g., a laptop, desktop, etc.), a workstation, or server that can communicate with the assessment device 104 and access data in the secondary data source 110 as needed. The assessment device 104 may be any type of portable computing device capable of executing the automated assessment tool 114 and interfacing with the network 106, such as a tablet computer, a smartphone, a notebook computer, a netbook computer, and the like. The network 106 can include any number and type of computing nodes operable to support networking functions of the network 106, including a combination of physical and virtual machines to support, for instance, a cloud-computing network.

In the example of FIG. 1, the post-processing system 102 and the assessment device 104 can each include a processor (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. The post-processing system 102 and the assessment device 104 can each include a local data storage device, such as a memory device, to store instructions and data. A memory device, also referred to herein as "computer-readable memory" (e.g., non-transitory memory devices, as opposed to transmission devices or media), may generally store program instructions, code, and/or modules that, when executed by a processing device, cause a particular machine to function in accordance with one or more embodiments described herein. In one example, the assessment device 104 and/or the post-processing system 102 executes computer instructions for implementing the exemplary processes described herein. Although only one instance of the post-processing system 102 and the assessment device 104 are depicted in FIG. 1, it will be understood that the system 100 can include multiple instances of the post-processing system 102 and/or the assessment device 104. Furthermore, the post-processing system 102 and the assessment device 104 can each execute a number of other programs beyond those depicted in FIG. 1, such as application programs and operating systems. The management application 112 and the automated assessment tool 114 may each be further subdivided into a number of modules or sub-programs.

The network 106 may establish communication within the system 100 using a combination of networks, such as a wide area network (WAN), a local area network (LAN), a global network (e.g., Internet), a virtual private network (VPN), and/or an intranet. The network 106 may support fiber optic, wired, and/or wireless communication links. The network 106 can support transmission of digitized data including digitized images, video, audio, and/or other data types. Other networks (not depicted) can also be utilized by elements of the system 100, such as cellular communication, satellite communication, and other network types known in the art.

The secondary data source 110 may be implemented using a variety of devices for storing electronic information. For instance, the secondary data source 110 may be implemented using memory contained in one or more cloud servers (not depicted) or in a dedicated data storage system. It will be understood that multiple storage devices may be employed as the secondary data source 110. For example, storage devices used to form the secondary data source 110 can be dispersed across the network 106, and each of the storage devices that collectively form the secondary data source 110 may be logically addressable as a consolidated data source across a distributed environment.

In some embodiments, the post-processing system 102 can be located at an office location 115 that is physically remote relative to the assessment device 104. The automated assessment tool 114 can be used to automate identification of a plurality of items 120 captured in a video stream. The automated assessment tool 114 can be used in a wide variety of environments and may focus on capturing predetermined types of items, depending on whether a safety item assessment, a structural/damage assessment, a loss/replacement value assessment, etc., is being performed. Examples of items 120 include safety-related items, building features/conditions, vehicle condition or damage, or smaller personal property items that have a higher risk of theft (e.g., personal electronics). The items 120 can also include animals, such as dogs. A number of computer vision-based algorithms can be used by the management application 112 and/or the automated assessment tool 114 to perform identification and analysis, as further described herein.

Figure 2:
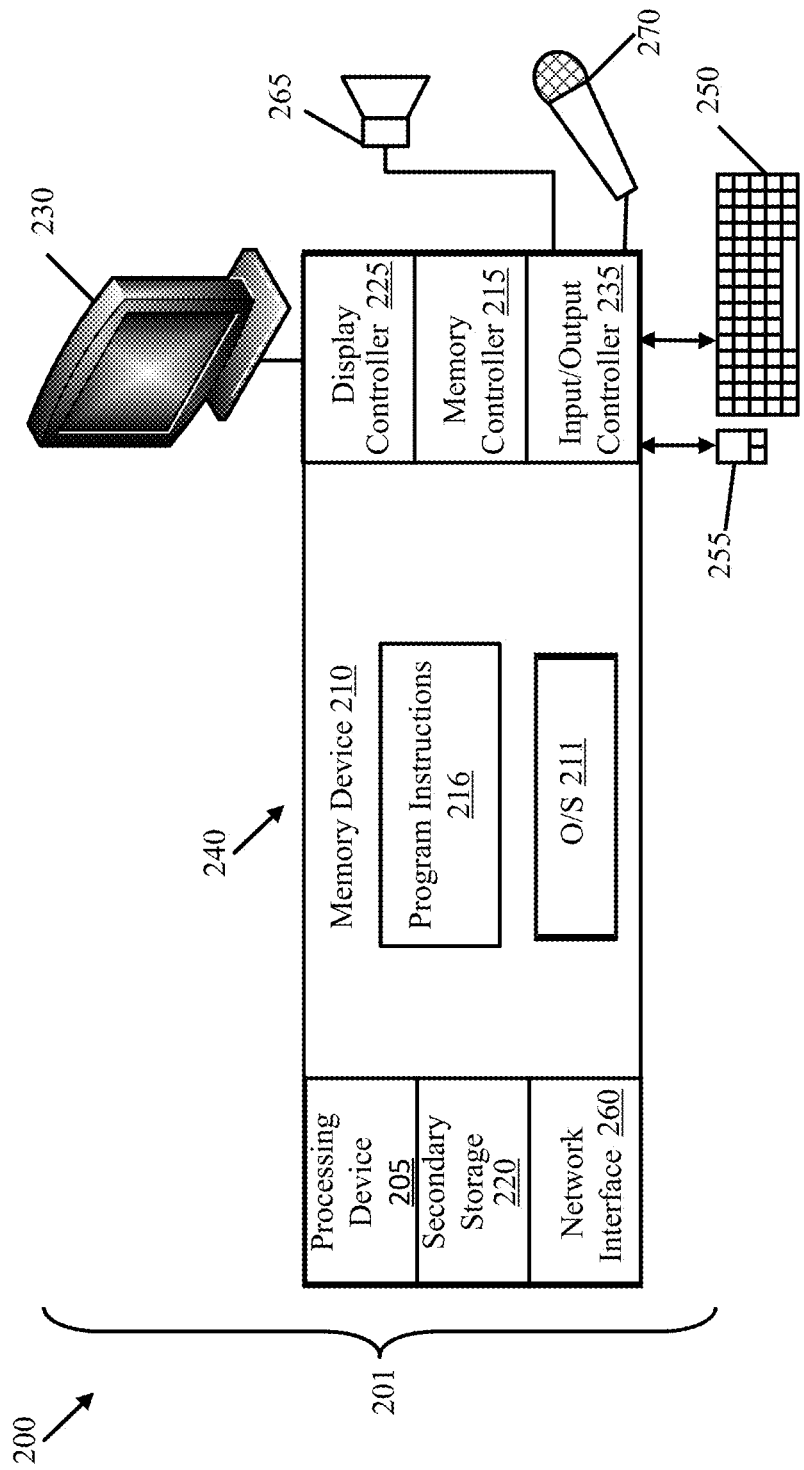
FIG. 2 depicts a block diagram of a post-processing system according to some embodiments of the present invention.

FIG. 2 depicts a block diagram of a system 200 according to an embodiment. The system 200 is depicted embodied in a computer 201 in FIG. 2. The system 200 is an example of the post-processing system 102 of FIG. 1.

In an exemplary embodiment, in terms of hardware architecture, as shown in FIG. 2, the computer 201 includes a processing device 205 and a memory device 210 coupled to a memory controller 215 and an input/output controller 235. The input/output controller 235 can be, for example, but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230. One or more speaker 265 and/or a microphone 270 can be coupled to the input/output controller 235 to support audio interactions with the assessment device 104. In an embodiment, the computer 201 can support Voice over Internet Protocol (VoIP) or other communication protocols known in the art.

The processing device 205 is a hardware device for executing software, particularly software stored in secondary storage 220 or memory device 210. The processing device 205 can be any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remote from one another, but can be accessed by the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the management application 112 of FIG. 1, where the system 200 is an embodiment of the post-processing system 102 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in the post-processing system 102 of FIG. 1, the network interface 260 can establish communication channels with the assessment device 104 of FIG. 1 and/or the secondary data source 110 of FIG. 1 via the network 106 of FIG. 1.

Figure 3:
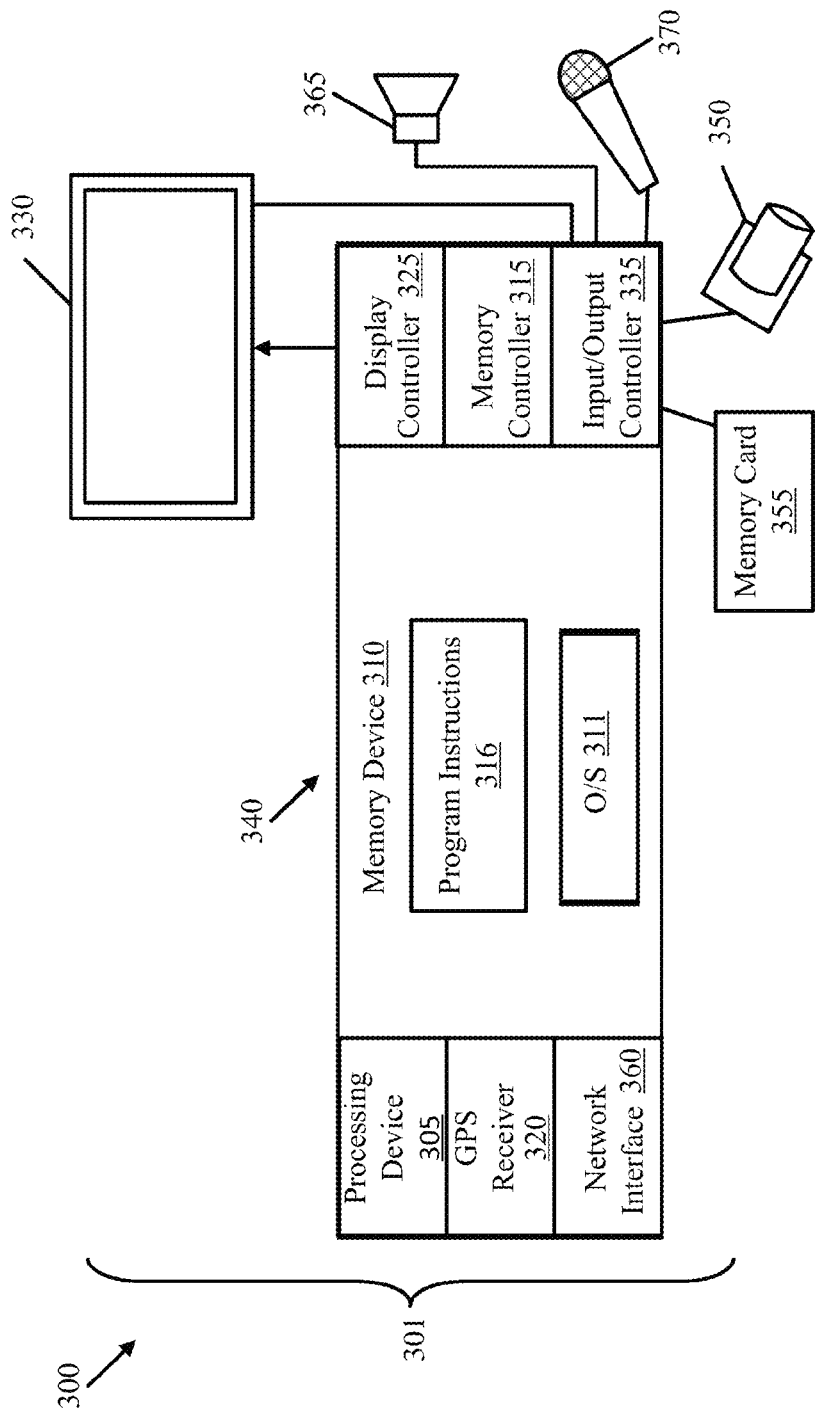
FIG. 3 depicts a block diagram of an assessment device according to some embodiments of the present invention.

FIG. 3 depicts a block diagram of a system 300 according to an embodiment. The system 300 is depicted embodied in a mobile computing device 301 in FIG. 3 as an example of the assessment device 104 of FIG. 1.

In an exemplary embodiment, in terms of hardware architecture, as shown in FIG. 3, the mobile computing device 301 includes a processing device 305 and a memory device 310 coupled to a memory controller 315 and an input/output controller 335. The input/output controller 335 can be, for example, but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the mobile computing device 301 may include address, control, and/or data connections to enable appropriate communications among the aforementioned components.

In some embodiments, a touch-sensitive display 330 or similar device can be coupled to the input/output controller 335. Alternatively, input may be received via a keypad, keyboard, or motion sensitive interface (not depicted). The input/output controller 335 can receive image data via one or more integrated camera 350. Extended storage capacity for image data, video, and the like may be supported using a memory card 355 interfaced to the input/output controller 335. The input/output controller 335 may also be coupled to one or more speaker 365 and/or microphone 370 to support video capture and playback, as well as audio interactions with the post-processing system 102 and/or secondary data source 110 of FIG. 1. In an embodiment, the mobile computing device 301 can support VoIP, cellular transmissions, or other communication protocols known in the art. The mobile computing device 301 can further include a display controller 325 coupled to the touch-sensitive display 330. In an alternate embodiment, a standard video display is provided in place of the touch-sensitive display 330 and other inputs, such as a keyboard and touchpad, are used to provide input to the mobile computing device 301.

The processing device 305 is a hardware device for executing software, particularly software stored in memory device 310. The processing device 305 can be any custom made or commercially available computer processor, a central processing unit (CPU), an auxiliary processor among several processors associated with the mobile computing device 301, a semiconductor-based microprocessor (in the form of a microchip or chip set), a macro-processor, or generally any device for executing instructions.

The memory device 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 310 may incorporate electronic, magnetic, optical, and/or other types of storage media. Accordingly, the memory device 310 is an example of a tangible computer readable storage medium 340 upon which instructions executable by the processing device 305 may be embodied as a computer program product. The memory device 310 can have a distributed architecture, where various components are situated remote from one another, but can be accessed by the processing device 305.

The instructions in memory device 310 may include one or more separate programs, each of which comprises an ordered listing of executable instructions for implementing logical functions. In the example of FIG. 3, the instructions in the memory device 310 include a suitable operating system (OS) 311 and program instructions 316. The operating system 311 essentially controls the execution of other computer programs and provides scheduling, input-output control, file and data management, memory management, and communication control and related services. When the mobile computing device 301 is in operation, the processing device 305 is configured to execute instructions stored within the memory device 310, to communicate data to and from the memory device 310, and to generally control operations of the mobile computing device 301 pursuant to the instructions. Examples of program instructions 316 can include instructions to implement the automated assessment tool 114 of FIG. 1, where the mobile computing device 301 is an embodiment of the assessment device 104 of FIG. 1.

The mobile computing device 301 may also include a global position system (GPS) receiver 320. The GPS receiver 320 may be used to generate geotags to apply to other data managed by the mobile computing device 301, such as image data (photos and/or video), audio, and other data values recorded. Geotags can identify a location where data was captured, such as coordinates of a location where the items 120 of FIG. 1 were located when associated data were captured. An internal clock (not depicted) can also provide date/time information with the geotag or as a separate data tag for assessment data, image data, and other data captured by the mobile computing device 301.

The mobile computing device 301 also includes a network interface 360 that can establish communication channels with one or more other computer systems via one or more network links. The network interface 360 can support wired and/or wireless communication protocols known in the art. For example, when embodied in the assessment device 104 of FIG. 1, the network interface 360 can establish communication channels with the post-processing system 102 of FIG. 1 and/or the secondary data source 110 of FIG. 1 via the network 106 of FIG. 1. The network interface 360 may also support one or more other types of networks, such as a cellular network and/or satellite communication.

Figure 4:
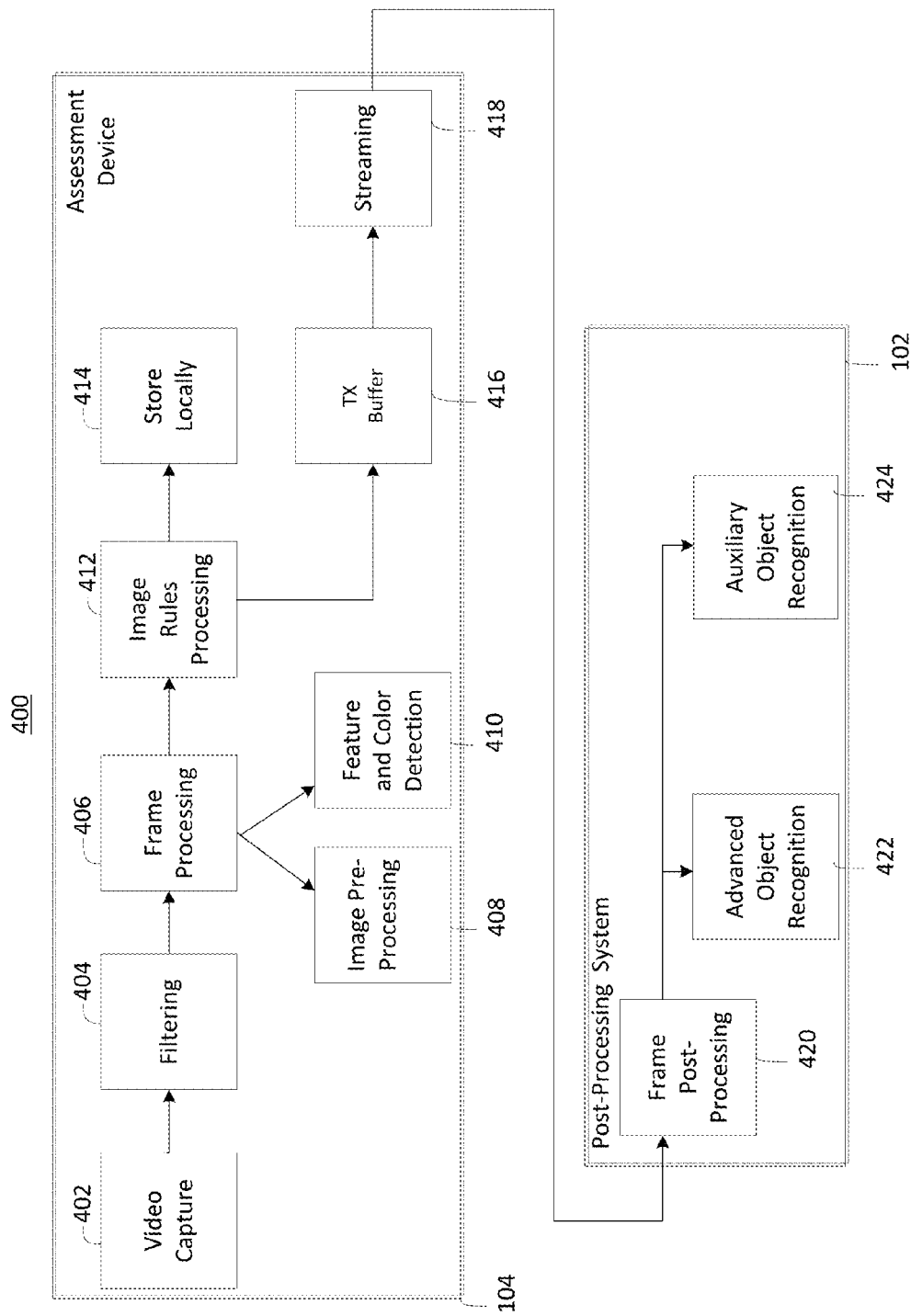
FIG. 4 depicts a block diagram of distributed processing and data flow according to some embodiments of the present invention.

FIG. 4 depicts a block diagram 400 of a distributed processing and data flow according to some embodiments. Video capture 402 of the assessment device 104 of FIG. 1 can receive a video stream that includes a plurality of image frames from an imaging source, such as the integrated camera 350 of FIG. 3. Image frames may be captured in sequence by the automated assessment tool 114 of FIG. 1. The video quality in terms of pixels and frame rate can be determined by the processing power of the assessment device 104 and optimal recognition capabilities of the image profile database 118 of FIG. 1. High-quality video streams do not necessarily enhance object recognition. For instance, higher-quality frames can include greater numbers of colors, reflections, and other picture artifacts that may complicate object recognition.

Filtering 404 may be applied on each image frame to optimize object recognition. As one example, filtering 404 may discard a number of frames (N) depending on the speed of the processing device 305 of FIG. 3 and available memory in the memory device 310 of FIG. 3. Since many frames contain similar if not identical information, object recognition need not be performed on each frame. In an alternate embodiment, each frame is evaluated relative to a last-processed frame to determine a difference score. Frames with difference scores falling below a predetermined threshold may be discarded. The filtering 404 can also eliminate a margin around each edge of the frame. Margin reduction can reduce false positive recognition from a partial object entering the frame as the integrated camera 350 of FIG. 3 is panned.

After the filtering 404, each filtered frame may be passed to frame processing 406, which is responsible for posting the image in the filtered frame through a series of image processing algorithms. In one embodiment, image processing can use one or more Open Source Computer Vision (OpenCV) algorithm or other such image processing algorithm libraries to perform image pre-processing 408 and/or feature and color detection 410. Frame processing 406 can be used to clarify and simplify the image. As one example, the image pre-processing 408 can blur the image to reduce the amount of detail. This may make simple object recognition easier but can complicate more advance recognition. As an example, a simple object recognizer may detect a computer in an image frame while an advanced object recognizer can identify the manufacturer and model of the computer. An advanced object detector not only recognizes the shape but also performs advanced feature recognition and/or character recognition to identify the computer's make and model, in this example. In one embodiment, the feature and color detection 410 can apply shape feature and color recognition for rapid real-time object detection. The filtering 404 or frame processing 406 may convert the frame to a hue saturation and value representation to support rapid color detection. The feature and color detection 410 can identify areas within the frame that match a desired color and shape when searching for items having known shape and color patterns. Other known detection algorithms can be applied in place of or in addition to the feature and color detection 410. The frame processing 406 may also support enhanced item identification by initiating and receiving results of a lookup operation in the secondary data source 110 of FIG. 1 to determine one or more item attributes of the identified items.

After frame processing 406, image rules processing 412 can determine how the assessment device 104 should respond in the presence or absence of a specific item. For example, in the context of a safety equipment assessment, the absence of expected safety equipment may be noted and relayed back to a user of the assessment device 104 and/or the post-processing system 102. The image rules processing 412 may also track the stream of images as they are received in the video to search for situations that require more advanced processing, such as determining if a fire extinguisher is charged.

After image rules processing 412, the frame can be stored locally 414 in its original form so that a user can replay the video as captured. The assessment device 104 can also modify the video stream to add an item identifier for each identified item to the video stream as an annotated video and store a record of the item attributes of the identified items in the annotated video.

Additional image processing and higher-level analysis in support of underwriting and/or other activities can be performed by the post-processing system 102. Each frame and/or other data to send to the post-processing system 102 can be placed in a transmission buffer 416. When using wireless and/or cellular communication on the network 106 of FIG. 1, there is a greater risk of data loss and/or delay. The transmission buffer 416 assures that problems in data transmission do not impact the video capture/recording process.

Streaming 418 from the assessment device 104 to the post-processing system 102 may be performed as a low priority asynchronous process to transfer buffered frames to the post-processing system 102. The streaming 418 can operate as a user commands other operations in the automated assessment tool 114 of FIG. 1 and resume if the user leaves the automated assessment tool 114 of FIG. 1 and later returns.

The post-processing system 102 can perform frame post-processing 420 on frames received from the streaming 418. The frame post-processing 420 may use advanced object recognition 422 and/or auxiliary object recognition 424 to perform more advanced and computationally intensive recognition algorithms, such as determining a dog breed. The advanced object recognition 422 may apply business-specific rules, for instance, to support insurance policy underwriting using definitions from the database 116 of FIG. 1. The auxiliary object recognition 424 can employ one or more external sources of the data for object recognition, such as the secondary data source 110 of FIG. 1. Depending upon the processing capabilities of the assessment device 104 and the post-processing system 102, as well as bandwidth and latency of the network 106 of FIG. 1, image processing and/or recognition can be redistributed between the assessment device 104 and the post-processing system 102. For example, all or part of the frame processing 406 and image rules processing 412 may be performed by the post-processing system 102. In other embodiments, all or part of the frame post-processing 420 can be performed by the assessment device 104. Where sufficient processing and communication resources are available, the post-processing system 102 may provide real-time or near real-time feedback of output from the advanced object recognition 422 and/or auxiliary object recognition 424 for display on the assessment device 104.

Figure 5:
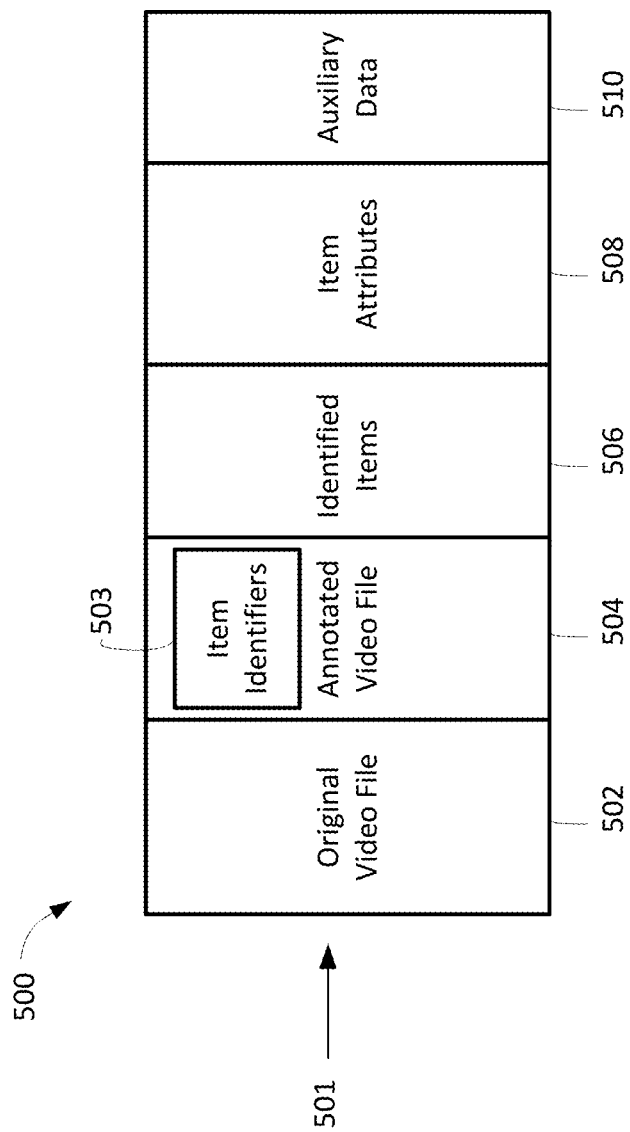
FIG. 5 depicts an example data structure according to some embodiments of the present invention.

FIG. 5 depicts an example data structure 500 that includes at least one assessment record 501. The assessment record 501 can be stored locally in the assessment device 104 of FIG. 1 and/or distributed in whole or in part to the post-processing system 102 of FIG. 1. The assessment record 501 may include an original video file 502 captured during an assessment. As one or more items are identified from the original video file 502, item identifiers 503 can be added to a video stream representative of the original video file 502 and stored in an annotated video file 504. The item identifiers 503 can be data tags and/or overlays that link to identified items 506, which can identify items by item type. The identified items 506 may also be linked to item attributes 508, which may include more detailed information, such as an item make and model, pricing information, and other such information that may be acquired by a lookup operation in the secondary data source 110 of FIG. 1 after item identification. The assessment record 501 can also include auxiliary data 510, such as location information (geotags), time/date values, and/or audio information to assist in detecting changes as newer values are collected.

While only a single instance of the assessment record 501 is depicted in FIG. 5, it will be understood that the data structure 500 can include many assessment records 501. The assessment record 501 can include additional information and data not depicted in FIG. 5. For example, each assessment record 501 may have an index value to support lookup operations, time/date stamps, and other assessment-related data.

Figure 6:
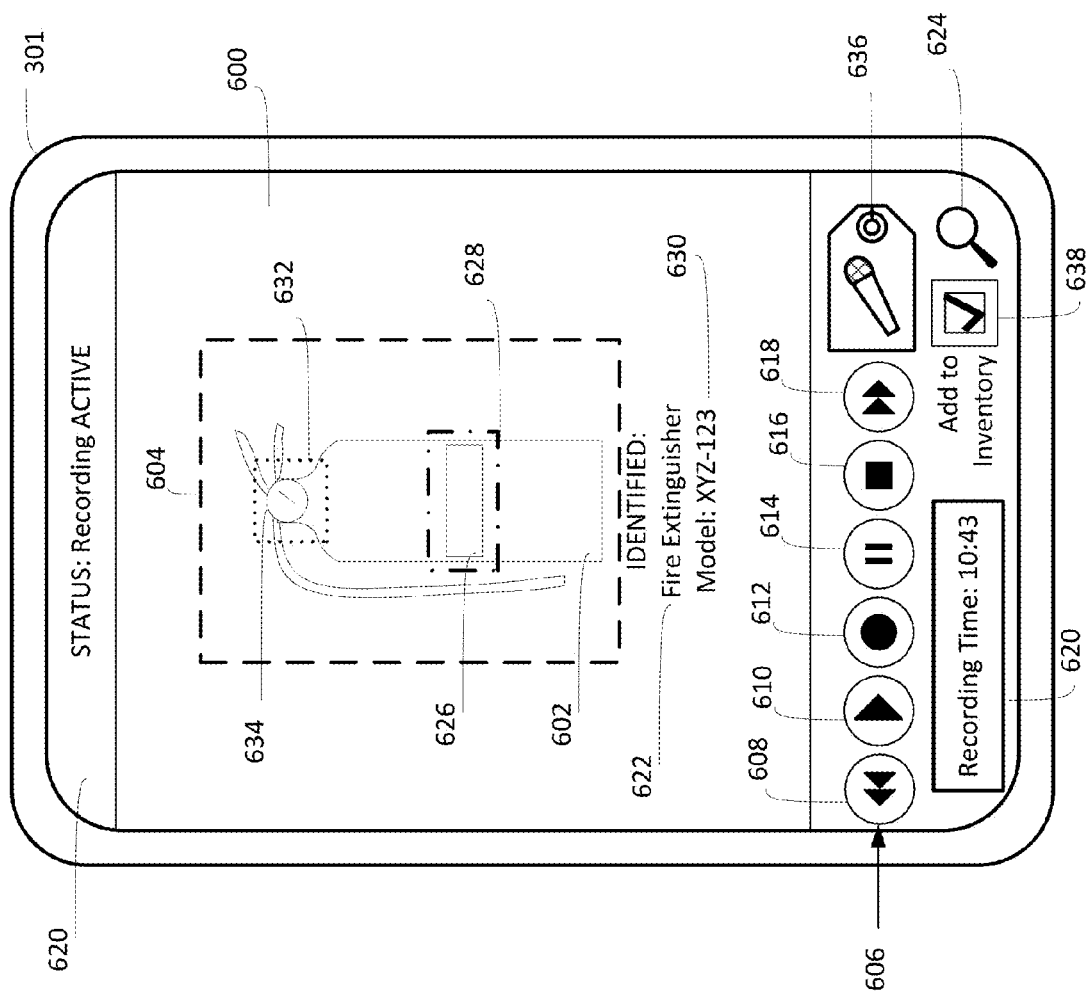
FIG. 6 depicts a user interface according to some embodiments of the present invention.

FIG. 6 depicts an example of a user interface 600 of the automated assessment tool 114 of FIG. 1 when running on mobile computing device 301 of FIG. 3 as the assessment device 104 of FIG. 1. The user interface 600 is a simplified example of a screen where a user can align an item 602 in an analysis frame 604. The analysis frame 604 need not be visible on the user interface 600. In one embodiment, the analysis frame 604 is only made visible upon identification of the item 602. In an alternate embodiment, display of the analysis frame 604 is a user-selectable option. The analysis frame 604 can be implemented statically or with a variable size that may scan visible regions of the user interface 600. Although only a single analysis frame 604 is depicted in FIG. 6, there may be multiple analysis frames 604 to detect multiple items in a same image frame at the same time. An outer margin comprising an area outside of the analysis frame 604 may be excluded from analysis to reduce the chance of capturing a partial view of an item.

The user interface 600 may also include one or more video control buttons 606 to rewind 608, play 610, record 612, pause 614, stop 616, and/or fast forward 618 a video. The user interface 600 can include one or more status indicators 620 to provide user feedback on video recording, playback, and other information. An identification status message 622 may be displayed upon identifying the item 602. Item identification can be performed generically as a particular type of item, such as a fire extinguisher. Upon an initial identification, the automated assessment tool 114 of FIG. 1 may automatically, or in response to a user command 624, initiate a lookup operation in the secondary data source 110 of FIG. 1 to determine one or more item attributes of an identified item. The secondary data source 110 of FIG. 1 may include a much larger library of image data than is present in the image profile database 118 of FIG. 1, such that a more precise identification can be achieved and/or additional attributes of the item 602 can be determined. As one example, the image profile database 118 of FIG. 1 may be sufficient to identify an item type in general, such as a fire extinguisher; however, the secondary data source 110 of FIG. 1 may be able to identify the manufacturer and/or model of the fire extinguisher based on visual cues, such as a cylinder contour, dispenser configuration and other such information. The secondary data source 110 of FIG. 1 can also provide other item attributes, such as an estimated replacement value or estimated price of the item 602.

To further enhance item identification, the automated assessment tool 114 of FIG. 1 may also attempt to locate a label 626 on item 602. For example, upon initial item identification in the analysis frame 604, the automated assessment tool 114 of FIG. 1 can use a label identifier frame 628 within the analysis frame 604 to seek a label. The label identifier frame 628 may be user adjustable to allow the user to manually align the label identifier frame 628 with the label 626, if needed. The label 626 can include one or more of: a barcode, a quick-response (QR) code, and an alphanumeric value. Accordingly, the automated assessment tool 114 of FIG. 1 can include or access a barcode reader, a QR code reader, and/or an optical character recognition (OCR) application to interpret identification information on the label 626. As a further option, if the label 626 cannot be read or automated label identification is not implemented/enabled, the automated assessment tool 114 of FIG. 1 can prompt the user to input one or more values of user-defined metadata for the item 602, for instance, based on the user reading the label 626 and/or other identifying information and manually entering the values as user-defined metadata. User input can be captured through a pop-up keyboard interface (not depicted) or using a voice-to-text interface that allows a user to read the label 626 aloud into the microphone 370 of FIG. 3 and convert the captured audio into a text format. Prompting for user input of user-defined metadata can also be helpful where there is no visible label 626 but the user is aware of one or more identifying attributes of the item 602. Any data captured from the label 626 and/or user-defined metadata can be used to perform the lookup operation in the secondary data source 110 of FIG. 1. Identified data from the label 626, from user-defined metadata, and/or item attributes returned from the lookup operation may be displayed on the user interface 600 as supplemental item data 630.

The automated assessment tool 114 of FIG. 1 may also perform item condition analysis by identifying one or more features of the item 602 for further tracking. A feature analysis frame 632 can locate one or more features 634, such as a gauge on a fire extinguisher. A record of each feature 634 of the item 602 may be created for current status and/or change detection. For example, if supported by image processing, a percentage of charge or fire extinguisher pressure along with a time/date stamp and location information based on the GPS receiver 320 of FIG. 3 can be created. This information may be tracked or otherwise deemed useful by the management application 112 of FIG. 1. A fire extinguisher that is improperly maintained can be noted. Also, if a subsequent video record is created at the same location on a later date, changes to the level of charge in the fire extinguisher and/or repositioning of the fire extinguisher may be useful to draw other conclusions or prompt further questioning. If the automated assessment tool 114 of FIG. 1 is unable to detect a charge level of the fire extinguisher using image processing, the automated assessment tool 114 of FIG. 1 may still record a date/time stamp and location information, while prompting the user to record the current level of charge manually.

The user interface 600 may also support creation of audio tags via an audio tag command 636. Audio tags can mark times in the video where a user is describing observed features or conditions of the item 602 either before or after the item 602 is identified. Audio captured with an audio tag may be separately extractable from the video, for example, converted from audio to text and stored in a record associated with the item. The audio tags can also be used to quickly index and search through a video file to locate footage in close proximity to where an item 602 is identified, while skipping transitional footage to speed subsequent post-processing.

An add-to-inventory command 638 can be used to affirmatively include an identified item in an assessment or inventory list. In some instances, the automated item identification provided by the automated assessment tool 114 of FIG. 1 may identify items that are not intended to be included in an assessment. The add-to-inventory command 638 marks the item 602 and associated data for inclusion in an assessment record. The add-to-inventory command 638 can be used in real-time while video is actively being recorded and/or can be used when later viewing the video to further annotate the video and adjust a final summary report of items located in the video.

It will be understood that the user interface 600 of FIG. 6 and subsequently described user interfaces of FIGS. 7-11 are merely examples, and elements can be added or removed.

Figure 7:
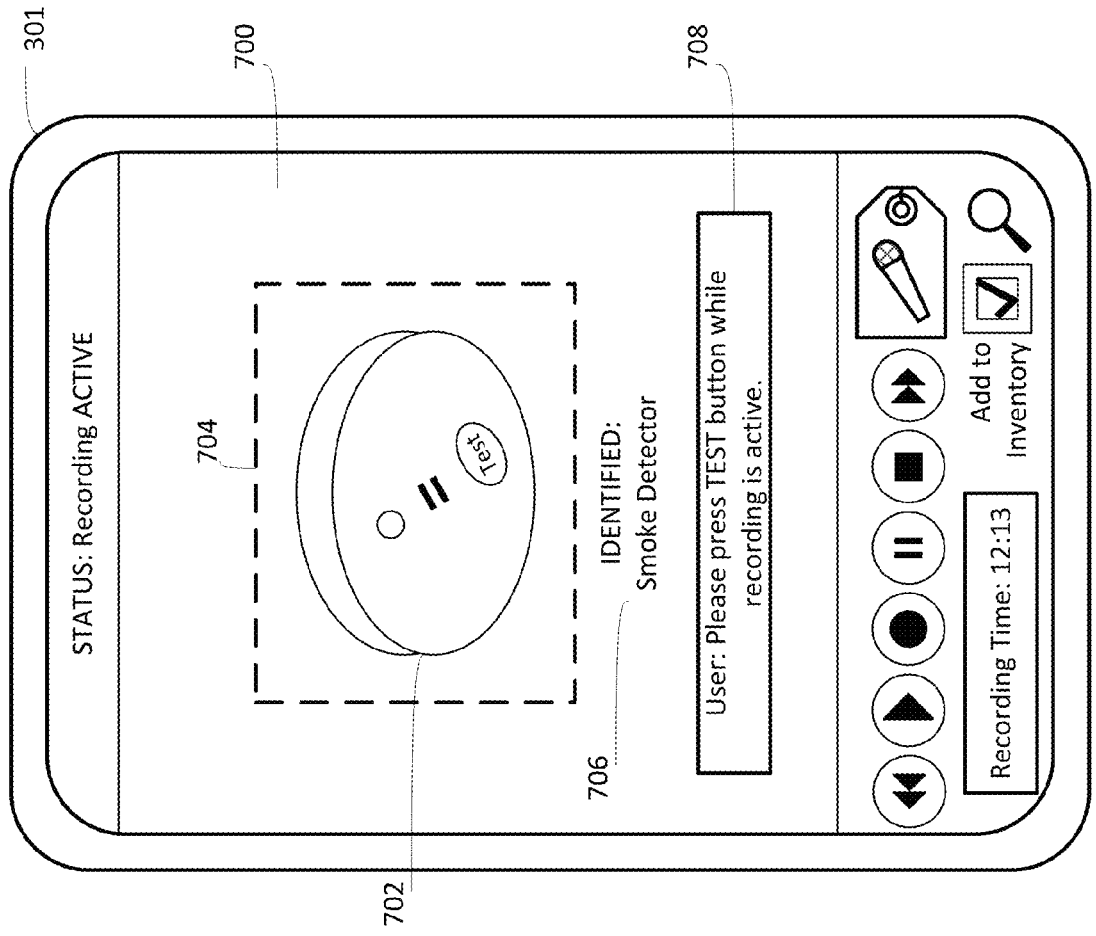
FIG. 7 depicts another example of a user interface according to some embodiments of the present invention.

FIG. 7 depicts another example of a user interface 700 of the automated assessment tool 114 of FIG. 1 when running on mobile computing device 301 of FIG. 3 as the assessment device 104 of FIG. 1. In the example of FIG. 7, an item 702 is identified in an analysis frame 704 as a smoke detector according to the image processing previously described with respect to FIG. 4. An identification status message 706 is displayed upon identifying the item 702. Additionally, an interactive command 708 may be displayed to the user that includes one or more instructions to follow while video recording is active. The instructions in the interactive command 708 can be selected for display based on identifying the item 702. For instance, in the example of FIG. 7, the instructions request that the user press a TEST button of the identified smoke detector to indicate whether the smoke detector is operational. The instructions in the interactive command 708 can be stored locally on the assessment device 104 of FIG. 1 or may be received from the post-processing system 102 of FIG. 1 or the secondary data source 110 of FIG. 1.

Figure 8:
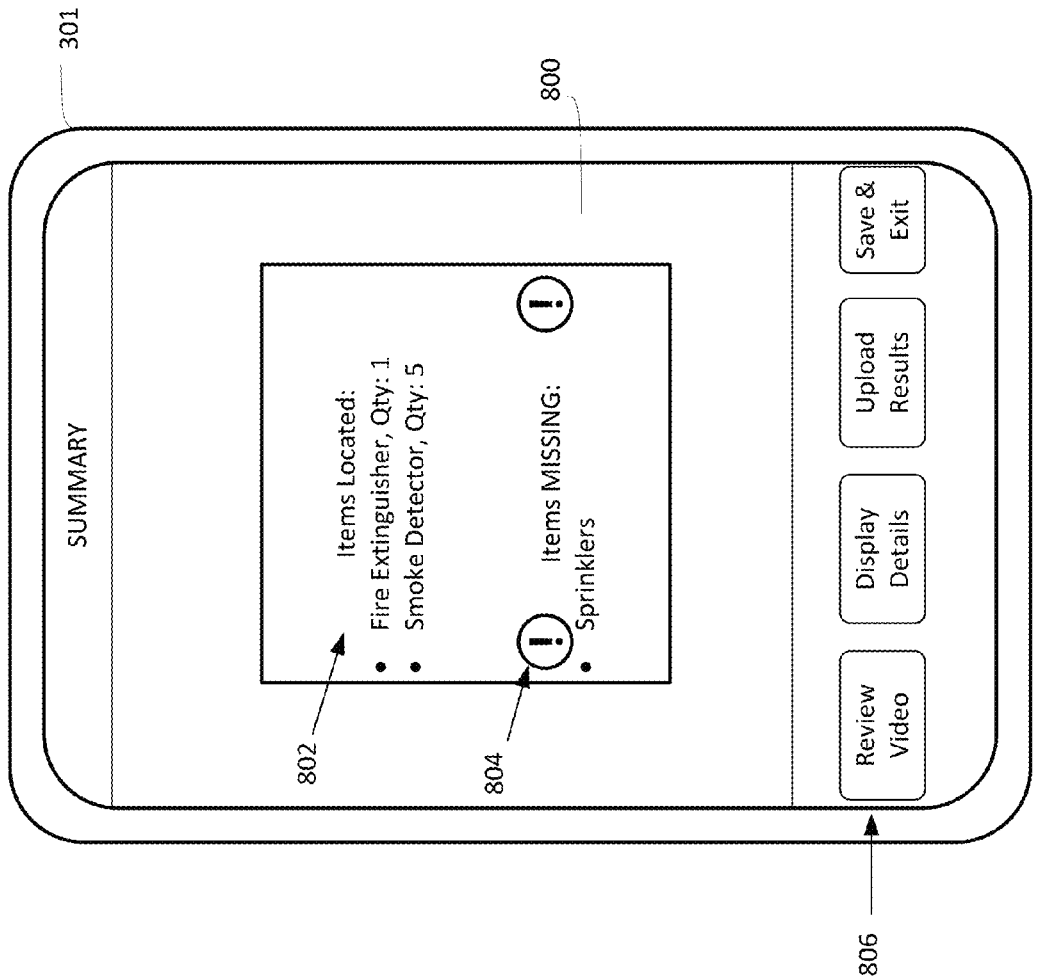
FIG. 8 depicts another example of a user interface according to some embodiments of the present invention.

FIG. 8 depicts an example of a user interface 800 of the automated assessment tool 114 of FIG. 1 when running on mobile computing device 301 of FIG. 3 as the assessment device 104 of FIG. 1. The user interface 800 is a summary display that may indicate a message relating to one or more identified items 802 based on identifying an end of the video stream. The list of identified items 802 can be displayed in a simple summary format to indicate an item type and quantity of such items. Further details about each of the identified items 802 may also be displayed upon request, for instance, via one or more commands 806. Where location indicators are stored for the identified items 802, the location of one or more of the identified items 802 can be displayed.

The user interface 800 can also display a list of missing items 804 that were expected, but not detected. As one example, the automated assessment tool 114 of FIG. 1 may access a list of expected items to find during an assessment, such as particular safety-related items. The automated assessment tool 114 of FIG. 1 may compare the list of expected items with a list of the identified items 802. The automated assessment tool 114 of FIG. 1 can output the list of missing items 804 based on determining that at least one of the expected items is not included in the list of identified items 802.

The list of identified items 802 may also be compared to one or more pattern sets that identify the likelihood of a condition being present or absent. For example, if the identified items 802 include items such as a doghouse, a dog run, a dog food dish, an animal bed, animal toys, and/or other such items, there is an expectation that the presence of a dog should also be identified. If the presence of a dog or other domestic animal has not been identified, the automated assessment tool 114 of FIG. 1 can directly prompt the user or send a notification to another system, such as the post-processing system 102 of FIG. 1, to inquire further based upon the identified items. Alternatively, the management application 112 of FIG. 1 can perform scoring and analysis of the video captured by the assessment device 104 of FIG. 1 as a post-processing activity. Thus, either the automated assessment tool 114 or the management application 112 can compute a likelihood score of a predetermined condition based on an identified presence or absence of items associated with the predetermined condition in the identified items 802. As an example, if there are five items associated with the presence of a dog, locating two such items can result in a likelihood score of 40%. The automated assessment tool 114 or the management application 112 can compare the likelihood score with a likelihood threshold (e.g., >50%) for the predetermined condition and output an indication of whether the predetermined condition likely exists based on the comparing.

Figure 9:
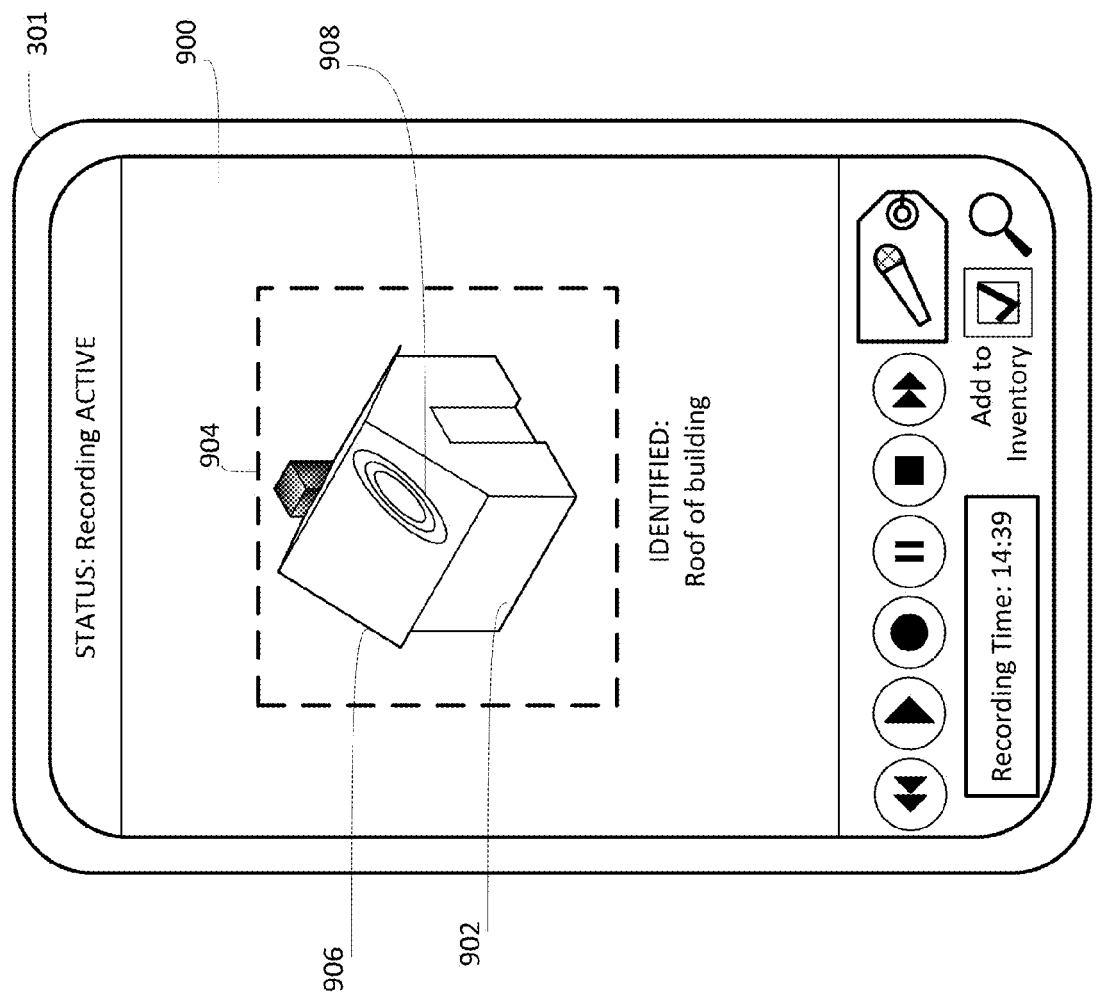
FIG. 9 depicts another example of a user interface according to some embodiments of the present invention.

FIG. 9 depicts another example of a user interface 900 of the automated assessment tool 114 of FIG. 1 according to some embodiments. The user interface 900 can locate an item 902 in analysis frame 904 to perform condition analysis and/or time-based trending analysis. In the example of FIG. 9, a structural condition related to the item 902 may be observed and tracked. Image processing may identify a roof 906 with one or more visually detectable conditions 908. The visually detectable conditions 908 may include missing shingles, warped shingles, discoloration, moss or vegetation growth, inconsistent shingles, and the like. In an embodiment where the imaging source of the video stream is a thermal imaging camera, the visually detectable conditions 908 may be thermal variations, e.g., a hot spot on the roof 906. The attributes observed can be captured using a voice-based narrative extracted from the audio component of the video stream or otherwise input. By comparing image data with image data from a previously saved video stream associated with the item 902, it can be determined whether a change in an aspect of the item 902 is detected, e.g., the visually detectable conditions 908 of the roof 906 are changing over time. A notification identifying the change can be output in response to detecting the change. The change analysis may be performed by the automated assessment tool 114 and/or the management application 112.

Figure 10:
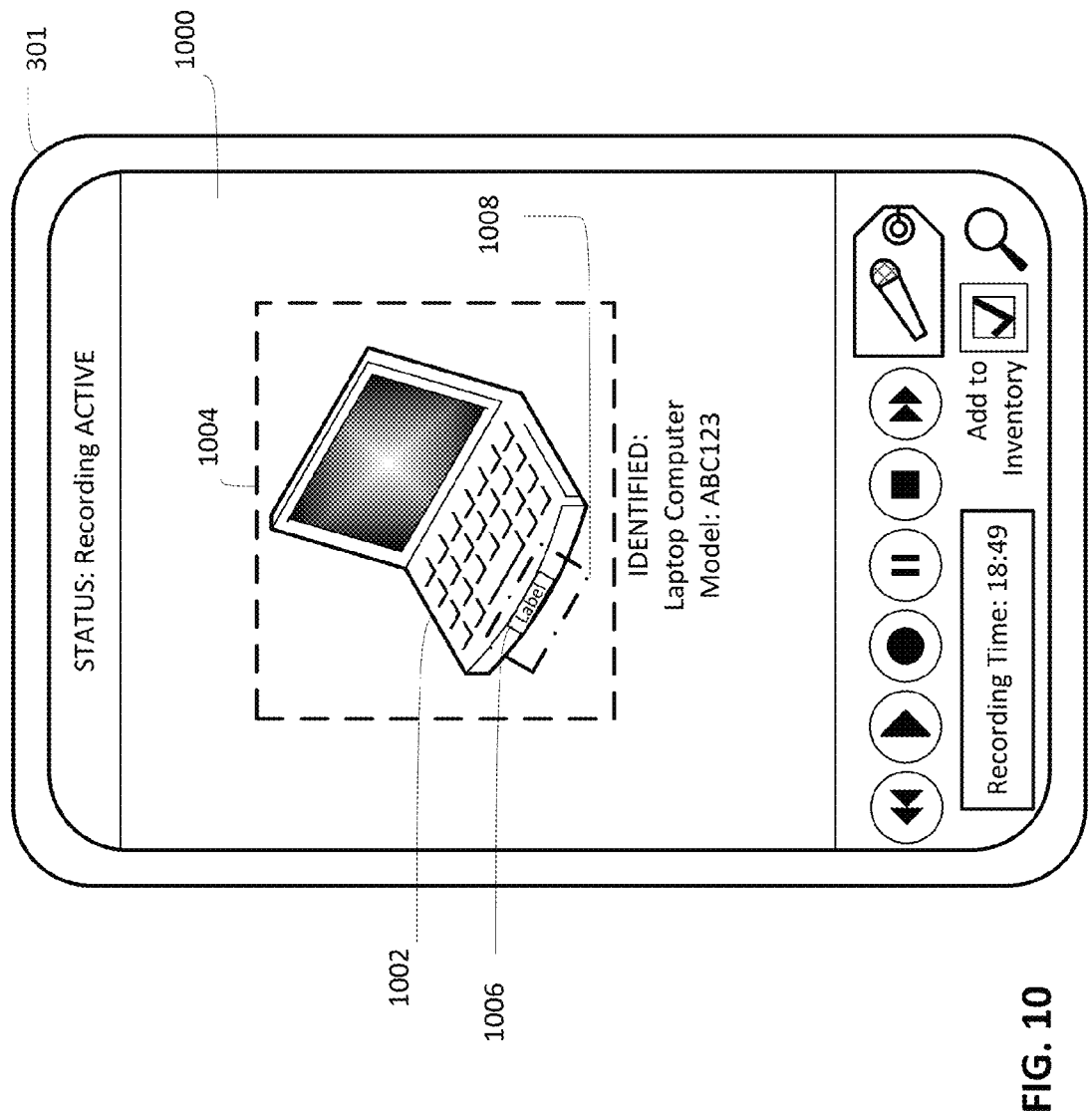
FIG. 10 depicts another example of a user interface according to some embodiments of the present invention.

FIG. 10 depicts another example of a user interface 1000 of the automated assessment tool 114 of FIG. 1 when running on mobile computing device 301 of FIG. 3 as the assessment device 104 of FIG. 1. In the example of FIG. 10, an item 1002 is identified in an analysis frame 1004 as a laptop computer according to the image processing previously described with respect to FIG. 4. As previously described with respect to FIG. 6, the automated assessment tool 114 of FIG. 1 may locate a label 1006 on item 1002 in a label identifier frame 1008. The example of FIG. 10 captures records of one or more items 1002 to develop an inventory of personal property, for example, in support of underwriting a homeowners or renters insurance policy. The automated assessment tool 114 of FIG. 1 may also support capturing and linking of purchase confirmation data with the item 1002 as evidence of ownership of the personal property.

Figure 11:
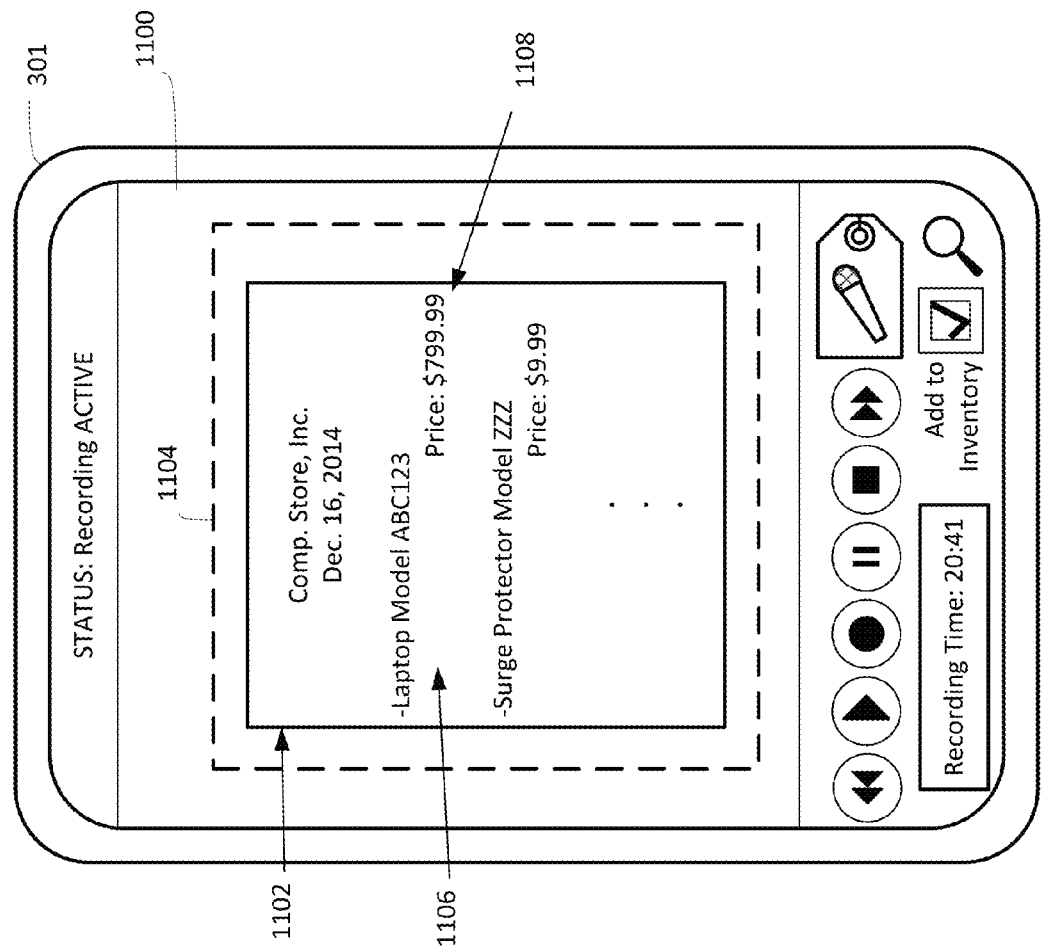
FIG. 11 depicts another example of a user interface according to some embodiments of the present invention.

In the example of FIG. 11, a user interface 1100 of the automated assessment tool 114 of FIG. 1 can identify an image of a purchase receipt 1102 in the video stream. The purchase receipt 1102 can be located at least in part within an analysis frame 1104, such that a purchase history 1106 of item 1002 is captured. The automated assessment tool 114 and/or the management application 112 of FIG. 1 can perform character recognition on the purchase receipt 1102 to determine whether the purchase receipt 1102 indicates a purchase history 1106 of item 1002. A purchase price 1108 may be identified on the purchase receipt 1102, which can be stored in a record based on the purchase history 1106. For instance, the data captured in FIG. 11 may be stored as evidence of a purchase price and purchase date (if captured) for an inventory item to support a potential replacement value of an insured item and/or as evidence of property ownership.

Figure 12:
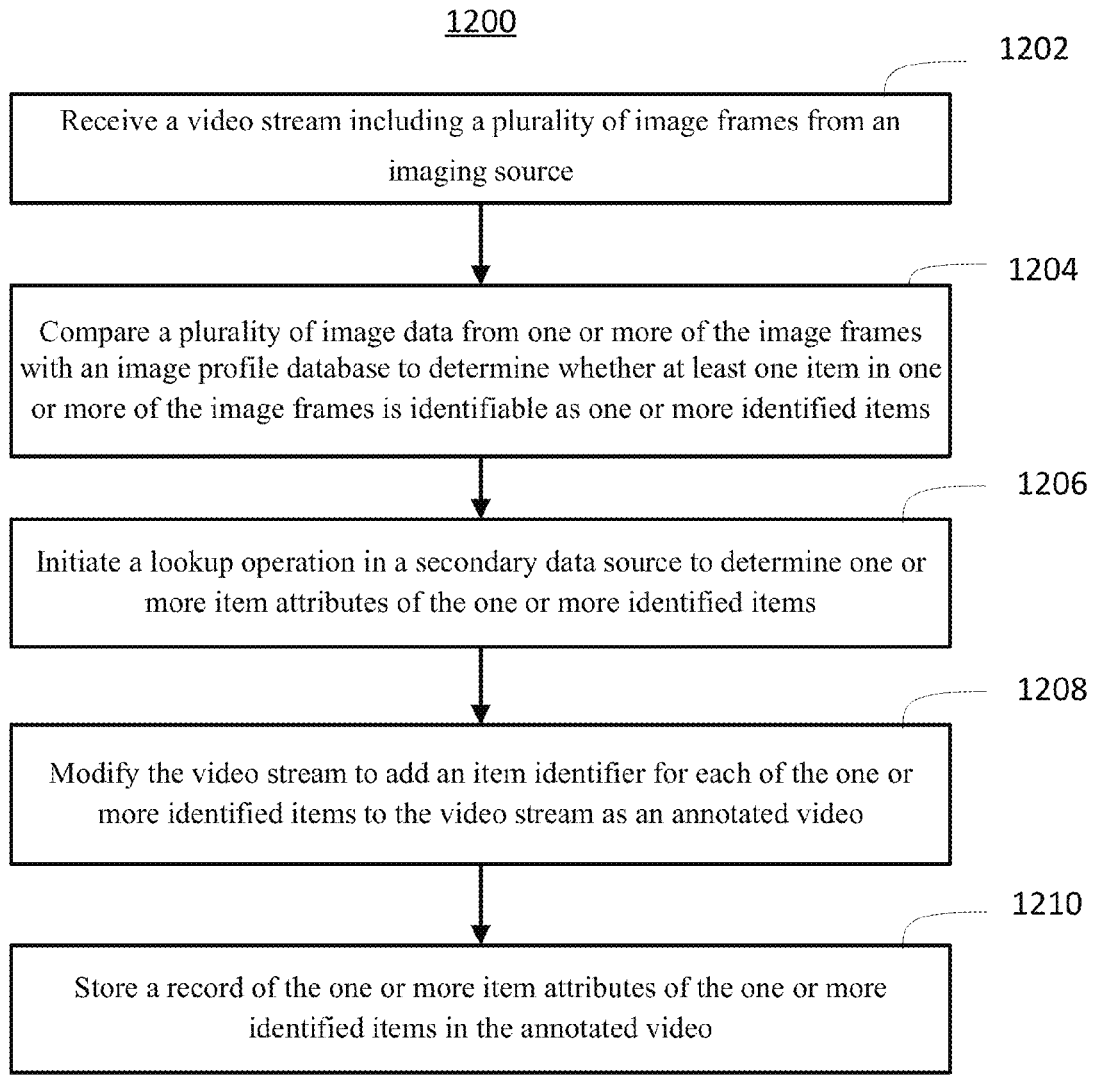
FIG. 12 depicts a process flow according to some embodiments of the present invention.

Turning now to FIG. 12, a process flow 1200 is depicted according to an embodiment. The process flow 1200 includes a number of steps that may be performed in the depicted sequence or in an alternate sequence. The process flow 1200 may be performed by the system 100 of FIG. 1. In one embodiment, the process flow 1200 is performed by the assessment device 104 of FIG. 1. The process flow 1200 is further described in reference to FIGS. 1-12.

At step 1202, the automated assessment tool 114 receives a video stream that includes a plurality of image frames from an imaging source, such as the integrated camera 350. Alternatively, the imaging source can be an external camera, such as a video camera or a thermal imaging camera. The imaging source can be integrated with, connected to, or remotely located from the assessment device 104. For instance, a Bluetooth data link, a Wi-Fi data link, or a satellite data link may provide the video stream. Alternatively, the video stream can be provided by a camera coupled by a wired connection to the assessment device 104, e.g., an HDMI or USB compatible camera.

At step 1204, the automated assessment tool 114 can compare a plurality of image data from one or more of the image frames with the image profile database 118 to determine whether at least one item in one or more of the image frames is identifiable as one or more identified items. For example, a combination of filtering 404, frame processing 406, and image rule processing 412 can be used to identify an item.

At step 1206, the automated assessment tool 114 can initiate a lookup operation in the secondary data source 110 to determine one or more item attributes of the one or more identified items. The secondary data source 110 can include an enhanced library of image data, such that rather than simply identifying an item type, a more specific identification can be made. As one example, the image profile database 118 may be detailed enough to identify an object as a dog, while the secondary data source 110 can identify a more detailed attribute, such as the breed of dog. The secondary data source 110 may also provide price or value data when used to assess item values for insurance or tax purposes. As such, the secondary data source 110 can include a product value database, where at least one of the one or more item attributes is an estimated price of the one or more identified items.

At step 1208, the video stream can be modified to add an item identifier for each of the one or more identified items to the video stream as an annotated video, such as the item identifiers 503 of the annotated video file 504. The video stream may be buffered as the video stream is received and stored locally 414 as an original video file 502 to support replay or the application of alternate image processing algorithms. Alternatively, the video stream may be modified after the video stream is buffered and while the video stream is being received. In other words, identification and annotation can occur substantially in real-time as video is being recorded or at any point thereafter.

At step 1210, a record of the one or more item attributes of the one or more identified items in the annotated video, such as record 501, can be stored in data structure 500. A local version of the data structure 500 may be held on the assessment device 104 until transmitted to the post-processing system 102 to be recorded in database 116. Thus, storing of a record can be performed locally on the assessment device 104 and/or across the network 106 on the post-processing system 102. The management application 112 can perform additional processing on the data. For example, the management application 112 can be part of an insurance underwriting system where various rules are applied to extract information or monitor for trends in the data received from the automated assessment tool 114. The management application 112 may also search in the original video file 502 or the annotated video file 504 to locate other items not detected by the assessment device 104, including further leveraging the secondary data source 110.

An audio component of the video stream may be analyzed by the automated assessment tool 114 and/or the management application 112 using voice recognition to extract additional information. For example, audio tags marked via the audio tag command 636 can mark portions of audio data that include a voice-based narrative to be extracted from the audio component of the video stream, such that the data can be stored in the record 501 as one or more additional features associated with the one or more identified items e.g., as auxiliary data 510.

Figure 13:
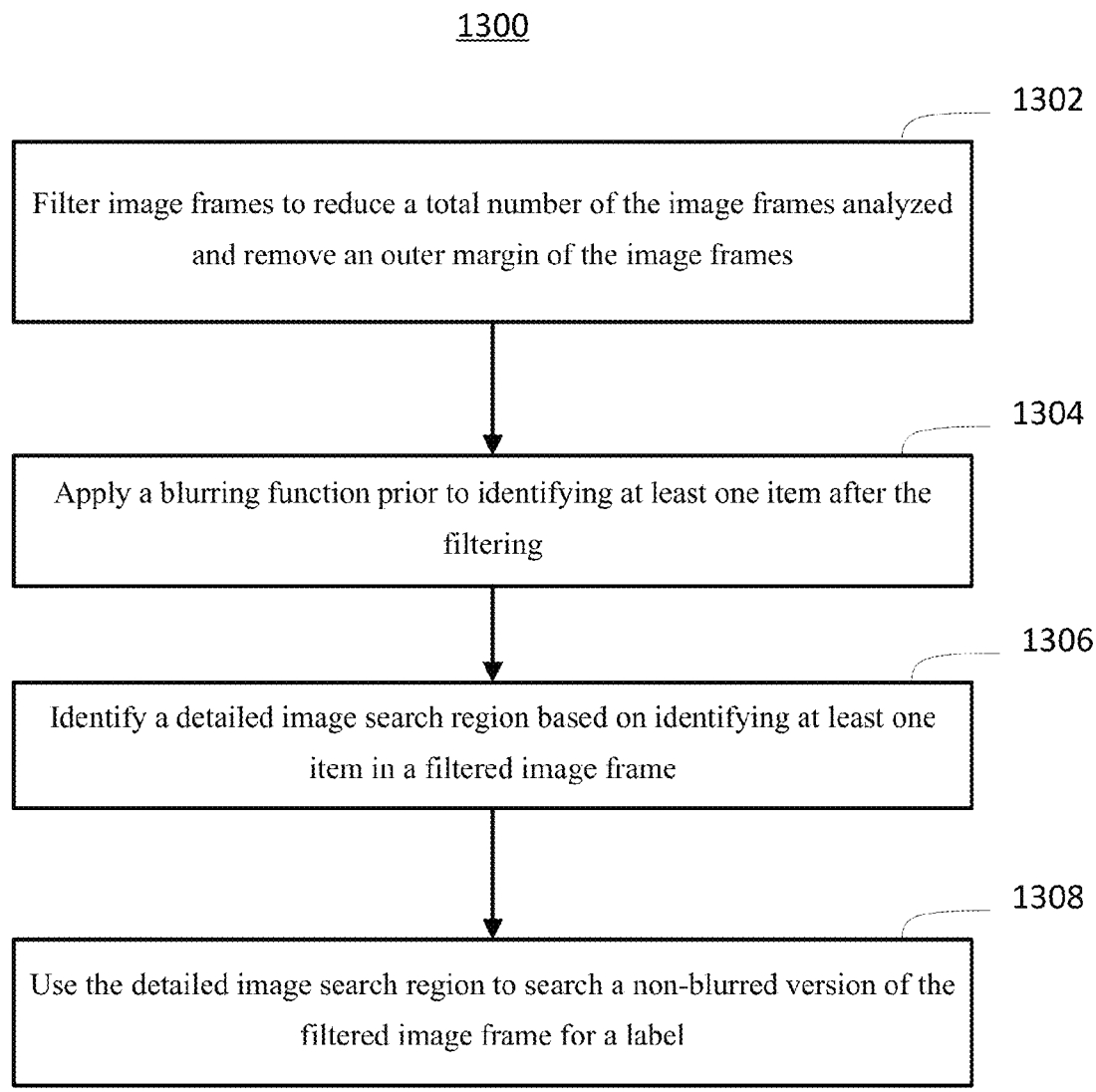
FIG. 13 depicts a process flow according to some embodiments of the present invention.

FIG. 13 depicts a process flow 1300 according to an embodiment. The process flow 1300 illustrates various steps that can be performed to enhance computer system performance by enhancing automated image processing to locate labels or other features for higher precision item identification of one or more items. In one embodiment, the process flow 1300 is performed by the assessment device 104 of FIG. 1; however, a portion or all of the process flow 1300 can be performed by the post-processing system 102 of FIG. 1. The process flow 1300 is further described in reference to FIGS. 1-13.

At step 1302, filtering 404 can be applied to image frames from video capture 402 to reduce a total number of the image frames analyzed and remove an outer margin of the image frames. At step 1304, a blurring function can be applied prior to identifying at least one item after the filtering, for example, as part of image pre-processing 408 of the frame processing 406.

At step 1306, a detailed image search region can be identified by the frame processing 406 based on identifying at least one item in a filtered image frame. Feature and color detection 410 may be used to identify one or more items in a filtered image frame.

At step 1308, a detailed image search region can be used to search a non-blurred version of the filtered image frame for a label or other feature. For example, frame processing 406 can make a blurred version of image data within the analysis frame 604 to identify that a fire extinguisher exists. Based on determining that a fire extinguisher exists, the frame processor 406 may use the non-blurred version of the filtered image frame to search for features, such as a label. A variety of label formats can be supported, such as one or more of: a barcode, a quick-response code, and an alphanumeric value. Once existence of the fire extinguisher is identified, the lookup operation in the secondary data source of step 1206 of FIG. 12 can be initiated on a non-blurred version of the filtered image frame as bounded by the analysis frame 604 using the label identifier frame 628 within the analysis frame 604 to search for label 626. The value of label 626 may be determined using a barcode reader, a QR code reader, and/or an OCR application or module.

Figure 14:
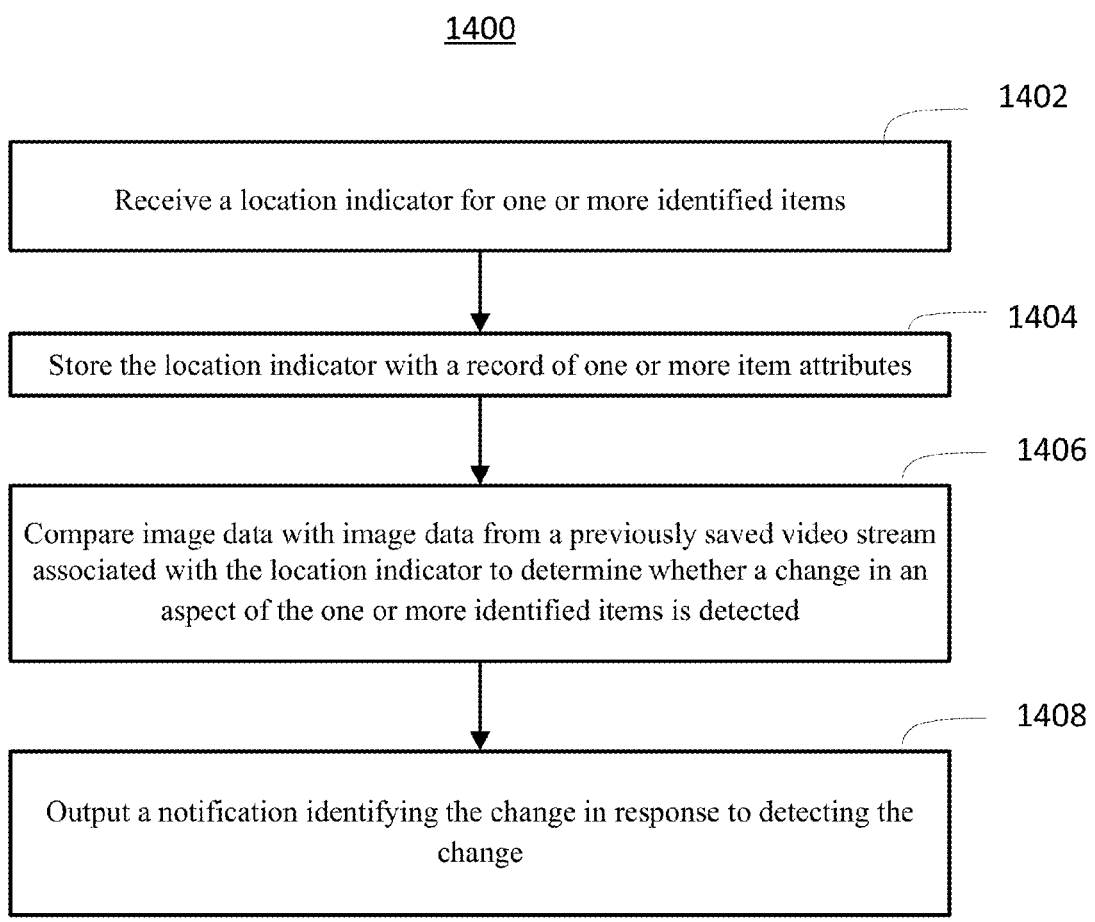
FIG. 14 depicts a process flow according to some embodiments of the present invention.

FIG. 14 depicts a process flow 1400 according to an embodiment. The process flow 1400 represents an example of change detection with respect to previously captured data. In one embodiment, the process flow 1400 is performed by the assessment device 104 of FIG. 1; however, a portion of the process flow 1400 can be performed by the post-processing system 102 of FIG. 1. The process flow 1400 is further described in reference to FIGS. 1-14.

At step 1402, a location indicator for at least one identified item can be received. The location identifier may be determined based on the values from the GPS receiver 320. At step 1404, the location indicator may be stored with the record 501 of the one or more item attributes 508, for instance as auxiliary data 510. At step 1406, image data can be compared with image data from a previously saved video stream associated with the location indicator to determine whether a change in an aspect of the one or more identified items is detected. Previous saved video may be stored in the assessment device 104 and/or in the database 116.

At step 1408, a notification identifying the change can be output in response to detecting the change. For instance, if the post-processing system 102 detects the change, it may provide notification back to the assessment device 104 that conditions, such as visually detectable conditions 908, appear to be getting worse. Alternatively, the assessment device 104 may perform the change detection and determine that the location of a fire extinguisher has changed or the level of charge in the fire extinguisher has changed. Other types of changes may also be identified.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
   a processing device; and
   a memory device in communication with the processing device, the memory device storing instructions that when executed by the processing device result in:
   receiving a video stream comprising a plurality of image frames from an imaging source;
   comparing a plurality of image data from one or more of the image frames with an image profile database to determine whether at least one item in one or more of the image frames is identifiable as one or more identified items;
   locating a label on at least one of the one or more identified items, the locating comprising:
   filtering the image frames to reduce a total number of the image frames analyzed and remove an outer margin of the image frames;
   applying a blurring function prior to identifying at least one item after the filtering;
   identifying a detailed image search region based on identifying at least one item in a filtered image frame; and
   using the detailed image search region to search a non-blurred version of the filtered image frame for the label;
   initiating a lookup operation in a secondary data source to determine one or more item attributes of the one or more identified items, wherein the lookup operation in the secondary data source is performed based on the label;
   modifying the video stream to add an item identifier for each of the one or more identified items to the video stream as an annotated video; and
   storing a record of the one or more item attributes of the one or more identified items in the annotated video.

2. The system of claim 1, further comprising instructions that when executed by the processing device result in:
   buffering the video stream as the video stream is received, wherein the modifying of the video stream is performed after the buffering of the video stream and while the video stream is being received.

3. The system of claim 1, further comprising instructions that when executed by the processing device result in:
   displaying a message relating to the one or more identified items based on identifying an end of the video stream.

4. The system of claim 1, further comprising instructions that when executed by the processing device result in:
   prompting for a user input to add one or more values of user-defined metadata for the one or more identified items.

5. The system of claim 4, wherein initiating the lookup operation in the secondary data source to determine one or more item attributes of the one or more identified items is based on the user-defined metadata.

6. The system of claim 1, wherein the label comprises one or more of: a barcode, a quick-response code, and an alpha-numeric value.

7. The system of claim 1, further comprising instructions that when executed by the processing device result in:
   receiving a location indicator for at least one of the one or more identified items; and
   storing the location indicator with the record of the one or more item attributes.

8. The system of claim 7, further comprising instructions that when executed by the processing device result in:
   comparing the image data with image data from a previously saved video stream associated with the location indicator to determine whether a change in an aspect of the one or more identified items is detected; and
   outputting a notification identifying the change in response to detecting the change.

9. The system of claim 1, further comprising instructions that when executed by the processing device result in:
   determining a time/date value associated with one of the image frames that includes at least one of the one or more identified items; and
   storing a time/date stamp in the record based on the time/date value.

10. The system of claim 1, wherein the secondary data source is a product value database, and at least one of the one or more item attributes is an estimated price of the one or more identified items.

11. The system of claim 1, further comprising instructions that when executed by the processing device result in:
    accessing a list of expected items;
    comparing the list of expected items with a list of the one or more identified items; and
    outputting a list of missing items based on determining that at least one of the expected items is not included in the list of the one or more identified items.

12. The system of claim 1, further comprising instructions that when executed by the processing device result in:
    computing a likelihood score of a predetermined condition based on an identified presence or absence of items associated with the predetermined condition in the one or more identified items;
    comparing the likelihood score with a likelihood threshold for the predetermined condition; and
    outputting an indication of whether the predetermined condition likely exists based on the comparing.

13. The system of claim 1, further comprising instructions that when executed by the processing device result in:
    identifying an image of a purchase receipt in the video stream;
    performing character recognition on the purchase receipt to determine whether the purchase receipt indicates a purchase history of at least one of the one or more identified items; and
    storing a purchase price identified on the purchase receipt in the record based on the purchase history.

14. The system of claim 1, wherein the imaging source comprises one or more of: a video camera and a thermal imaging camera.

15. The system of claim 1, further comprising instructions that when executed by the processing device result in:
    analyzing an audio component of the video stream using voice recognition; and
    storing in the record one or more additional features associated with the one or more identified items using a voice-based narrative extracted from the audio component of the video stream.

16. The system of claim 1, further comprising instructions that when executed by the processing device result in:
    capturing the annotated video and the record of the one or more item attributes of the one or more identified items in an insurance underwriting system.

17. A computer program product comprising a non-transitory storage medium embodied with computer program instructions that when executed by a computer cause the computer to implement:
    receiving a video stream comprising a plurality of image frames from an imaging source;
    comparing a plurality of image data from one or more of the image frames with an image profile database to determine whether at least one item in one or more of the image frames is identifiable as one or more identified items;
    locating a label on at least one of the one or more identified items, the locating comprising:
        filtering the image frames to reduce a total number of the image frames analyzed and remove an outer margin of the image frames;
        applying a blurring function prior to identifying at least one item after the filtering;
        identifying a detailed image search region based on identifying at least one item in a filtered image frame; and
        using the detailed image search region to search a non-blurred version of the filtered image frame for the label;
    initiating a lookup operation in a secondary data source to determine one or more item attributes of the one or more identified items, wherein the lookup operation in the secondary data source is performed based on the label;
    modifying the video stream to add an item identifier for each of the one or more identified items to the video stream as an annotated video; and
    storing a record of the one or more item attributes of the one or more identified items in the annotated video.

18. The computer program product of claim 17, wherein the label comprises one or more of: a barcode, a quick-response code, and an alpha-numeric value.

19. The computer program product of claim 17, further comprising computer program instructions that when executed by the computer cause the computer to implement:
    receiving a location indicator for at least one of the one or more identified items; and
    storing the location indicator with the record of the one or more item attributes.

20. The computer program product of claim 19, further comprising computer program instructions that when executed by the computer cause the computer to implement:
    comparing the image data with image data from a previously saved video stream associated with the location indicator to determine whether a change in an aspect of the one or more identified items is detected; and
    outputting a notification identifying the change in response to detecting the change.

21. The computer program product of claim 17, further comprising computer program instructions that when executed by the computer cause the computer to implement:
    computing a likelihood score of a predetermined condition based on an identified presence or absence of items associated with the predetermined condition in the one or more identified items;
    comparing the likelihood score with a likelihood threshold for the predetermined condition; and
    outputting an indication of whether the predetermined condition likely exists based on the comparing.

* * * * *